July 21, 1953 J. R. STOVALL, JR 2,646,215

AUTOMATIC TOLL COLLECTOR DEVICE

Filed April 15, 1949 8 Sheets-Sheet 1

INVENTOR.
John R. Stovall Jr.

AUTOMATIC TOLL COLLECTOR DEVICE

Filed April 15, 1949 8 Sheets-Sheet 2

INVENTOR.
John R. Stovall Jr

July 21, 1953 J. R. STOVALL, JR 2,646,215

AUTOMATIC TOLL COLLECTOR DEVICE

Filed April 15, 1949 8 Sheets-Sheet 3

INVENTOR.
John R. Stovall Jr

July 21, 1953 J. R. STOVALL, JR 2,646,215

AUTOMATIC TOLL COLLECTOR DEVICE

Filed April 15, 1949 8 Sheets-Sheet 4

INVENTOR.

John R. Stovall Jr.

July 21, 1953 J. R. STOVALL, JR 2,646,215

AUTOMATIC TOLL COLLECTOR DEVICE

Filed April 15, 1949 8 Sheets-Sheet 5

INVENTOR.
John R. Stovall Jr.

July 21, 1953 J. R. STOVALL, JR 2,646,215

AUTOMATIC TOLL COLLECTOR DEVICE

Filed April 15, 1949 8 Sheets-Sheet 6

INVENTOR.
John R. Stovall Jr

INVENTOR.
John R. Stovall Jr.

INVENTOR.
John R. Stovall Jr.

Patented July 21, 1953 2,646,215

UNITED STATES PATENT OFFICE 2,646,215

AUTOMATIC TOLL COLLECTOR DEVICE

John R. Stovall, Jr., Doylestown, Pa.

Application April 15, 1949, Serial No. 87,681

18 Claims. (Cl. 235—33)

The present invention relates to an automatic toll collecting device to provide for automatic collection and indication of tolls such as are collected, for example, on certain privately or publicly owned bridges, highways, and tunnels. Hand collection of these fees not only requires the payment of salaries for operating personnel, but has other much more serious disadvantages. Toll stations are always a source of considerable traffic congestion, and traffic hazards and the resulting waiting and slowness of movement are irritating to customers of the byways. Furthermore, the number of vehicles that can be handled per hour is greatly limited by hand collection of fees in a limited number of lanes, usually three or less. In addition the ratio between the average traffic and the demand traffic is so large that it is not economically feasible to keep personnel sufficient in number to cope in any real degree with the short duration, tremendously heavy traffic. Likewise, an attempt to prevent the congestion by utilizing floating personnel is expensive in itself, and also requires the construction of additional collection lanes. The width and cost of bridges, highways, and tunnels is proportional to the number of lanes. The hereinafter described equipment eliminates these difficulties by relatively simple installations that not only speed up the fee collection, but also amortize their cost in a few years by reduction in operating salaries together with increased revenue from larger traffic handling capacity.

Figure 10:
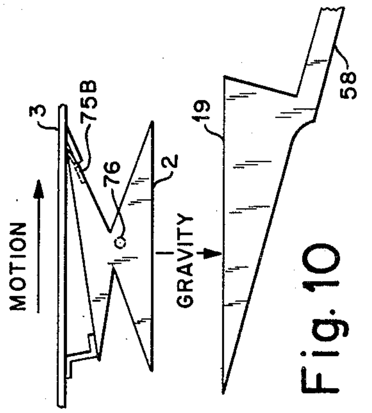
Figure 9:
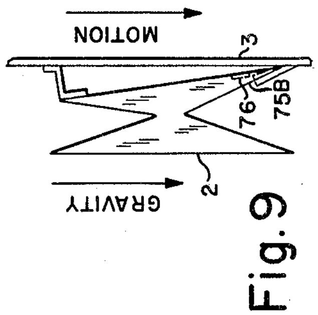
Figure 8:
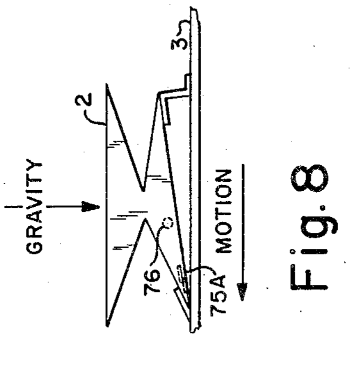
Figure 5:
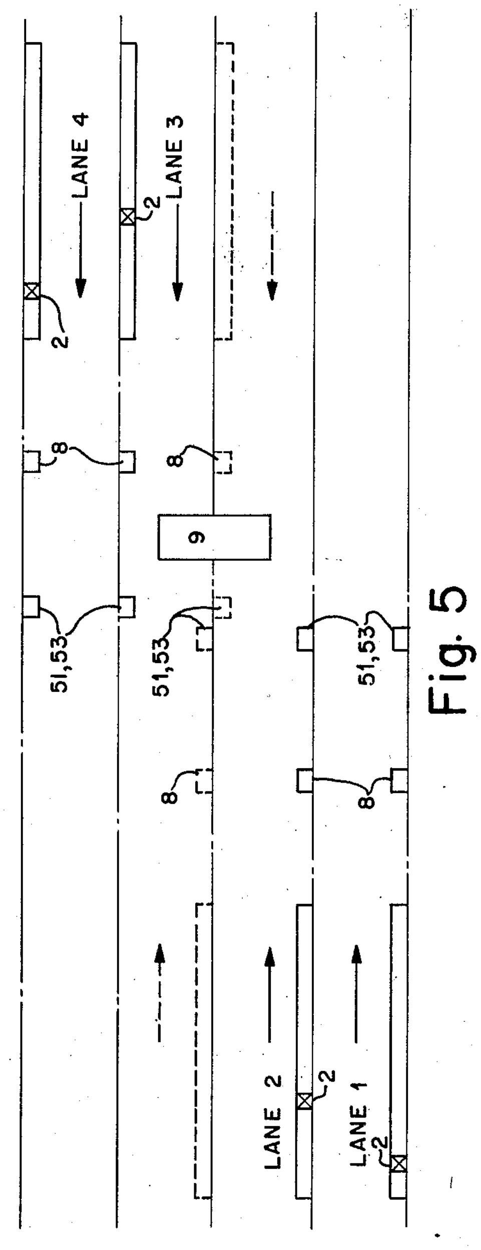
Figure 6:
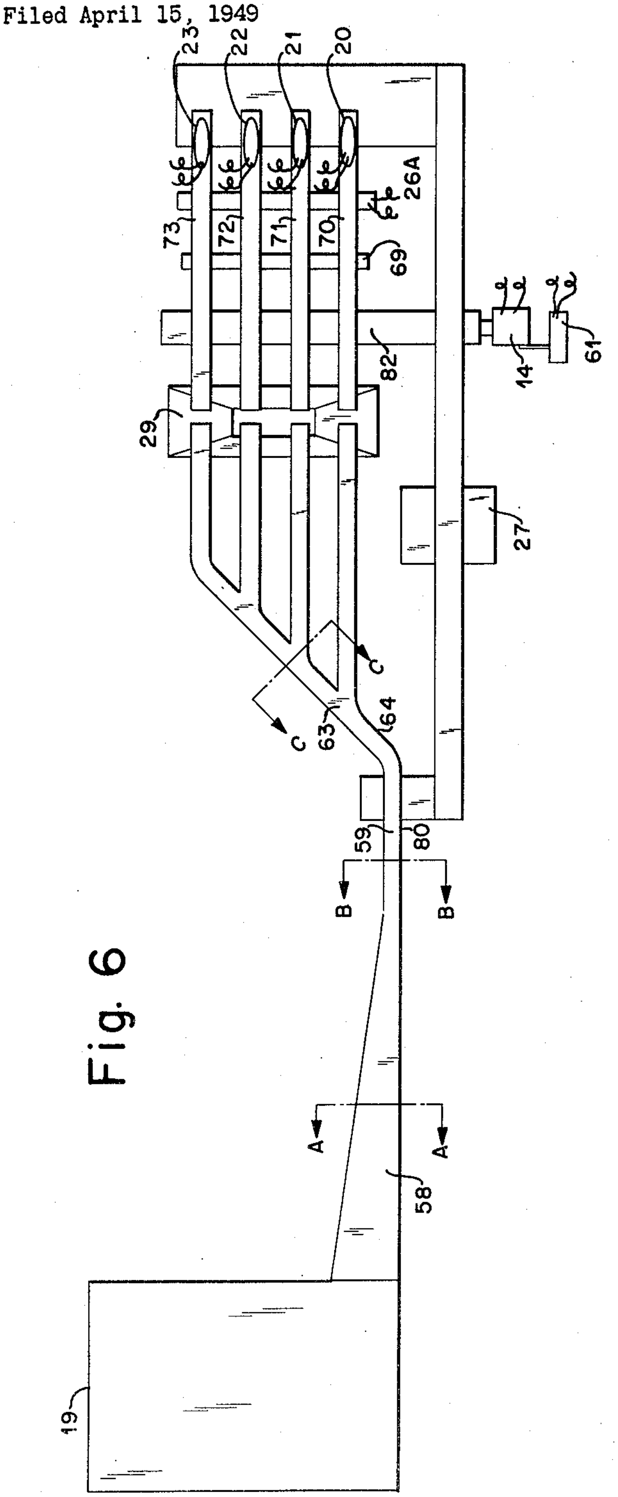
Figure 16:
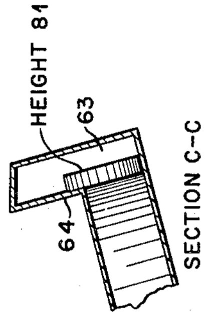
Figure 12:
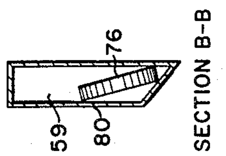
Figure 11:
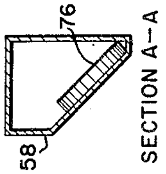
Figure 7:
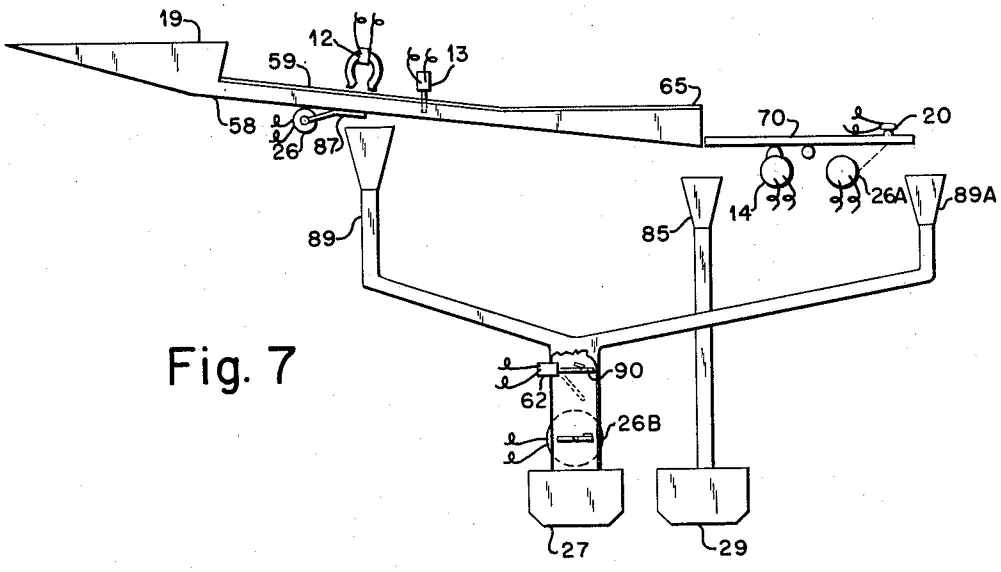
Figures 15, 15A:
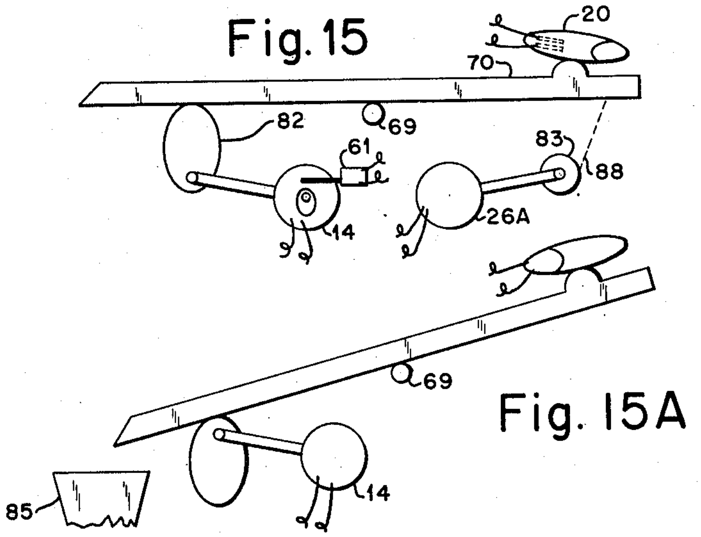
Figure 15B:
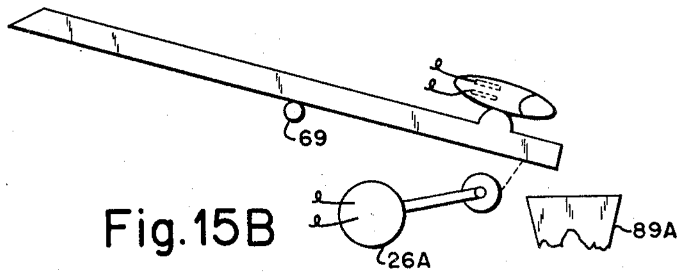
Figure 13:
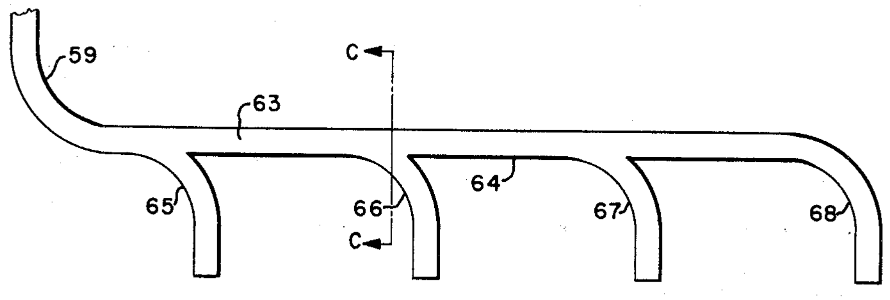
Figure 14:
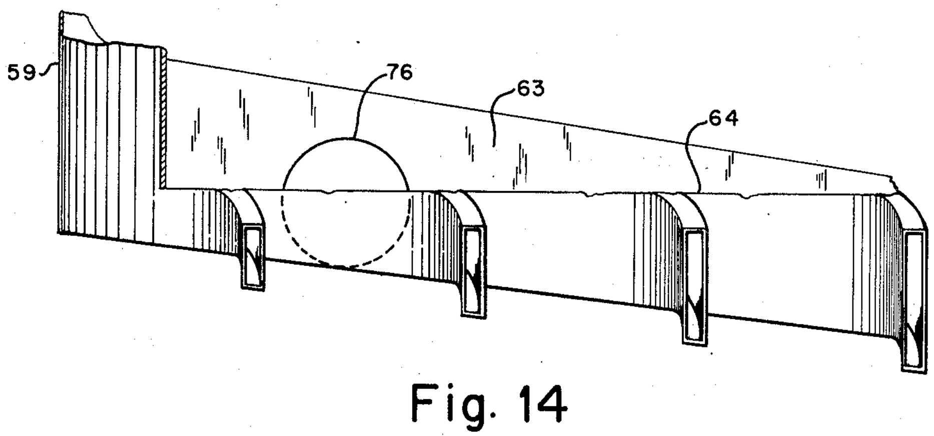
Figure 17:
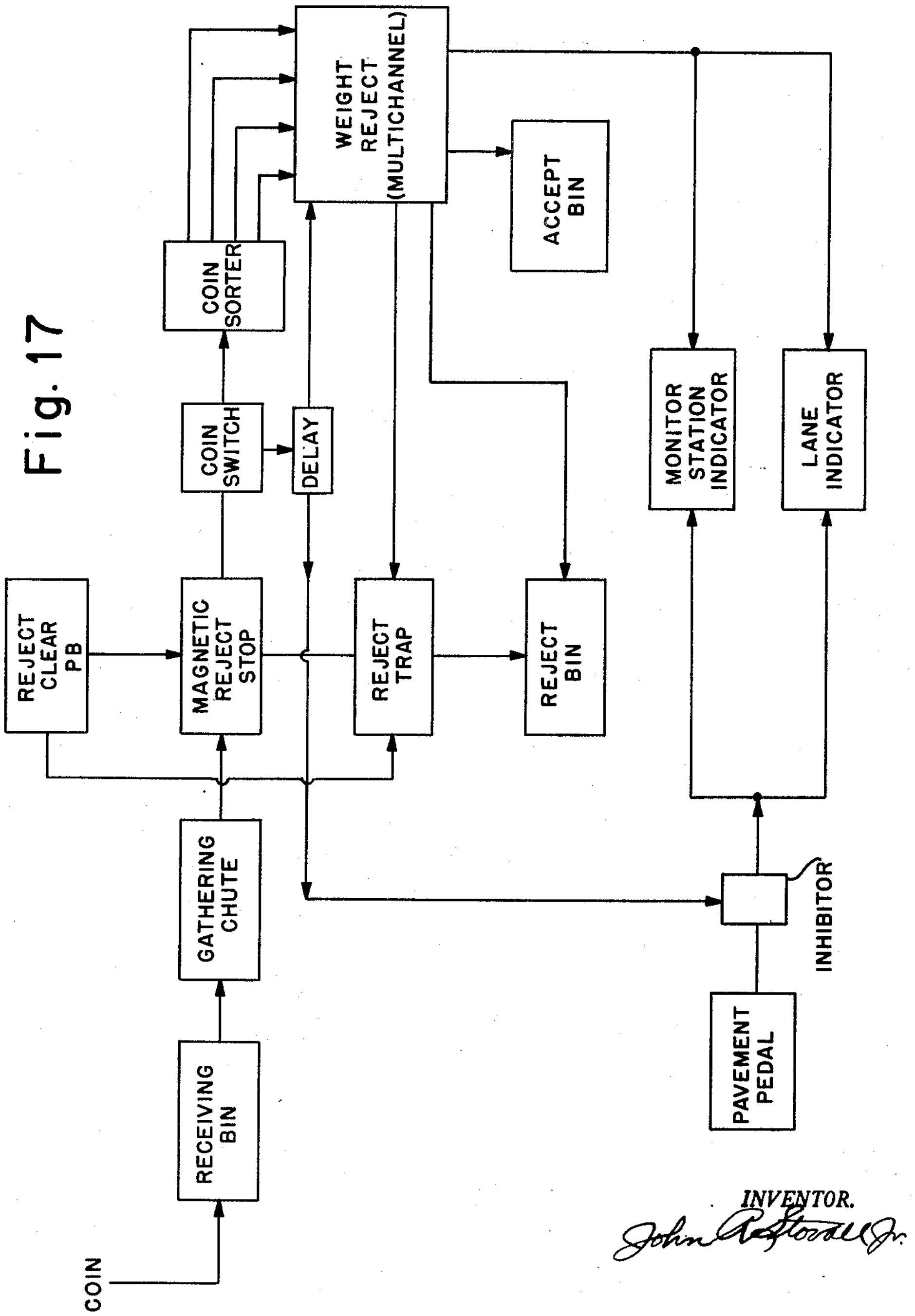

Figure 5 gives a top plan view of the installations at the traffic lanes;

Figure 6 is a top plan view of the sorting and registering apparatus;

Figure 7 gives an elevated side view of the sorting and registering apparatus;

Figures 8, 9 and 10 show the collector pans in three different positions during operations;

Figures 11, 12 and 16 illustrate three different cross sections of the chutes which guide the deposits from the receiving bin to the weighing apparatus;

Figures 13 and 14 give a top plan view and an elevated side view of the sorting chute, respectively;

Figures 15, 15A and 15B show a weighing lever in the three different operating positions; and Figure 17 is a block diagram illustrating the sequence of operations.

In the collection of tolls with this automatic equipment, the following general scheme is used. A conveyor type chain or belt having a series of attached collections boxes is set up beside each traffic lane. This chain with the boxes is made to move, with the vehicles moving alongside and synchronizing themselves approximately with the moving chain. The velocity is such that traffic moves briskly, but slowly enough for safety when the toll is deposited by the driver in a collection box. The boxes are spaced along the belt at suitable distances, and the chain returns within the equipment. Thus the driver sees a moving group of collection boxes, at arm height level, with which he synchronizes his speed and deposits the correct toll as posted at the entrance to the byway and at the collection station.

At the end of the collection run the collection box goes into the body of the equipment, deposits the coins, tokens, or tickets in an automatic register which rejects slugs, tabulates the amount deposited and indicates it beside the lane for the driver to view, and simultaneously in the control house where the observer notices the amount registered and the type vehicle. All collections are registered in the control house, and the collection boxes in all lanes are timed so that a regular pattern of registrations occur in order that the observer can check them without confusion.

Figures 1, 1A:
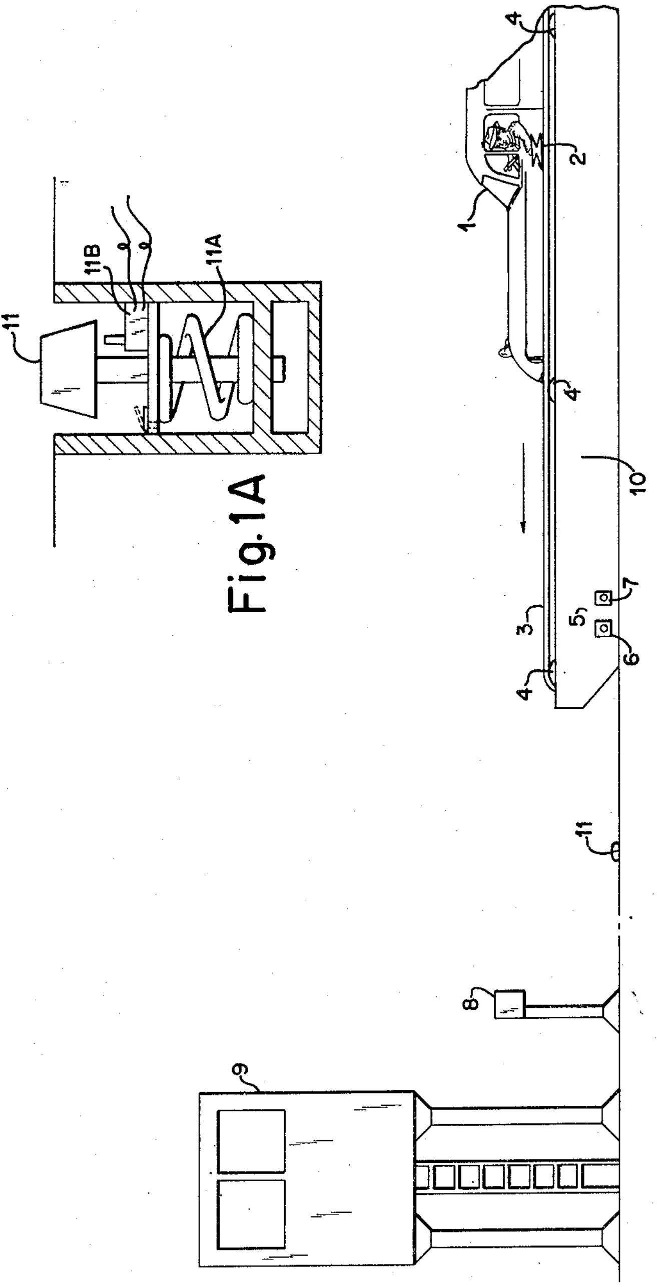
Figure 1 is an elevated side view of the collector system in operation.
Figure 1A is an enlarged detail of the pavement pedal.
Figure 3D:
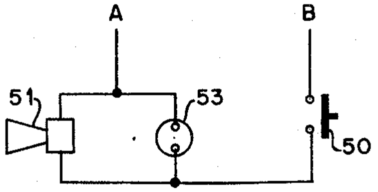
Figure 3D is a stop signaling circuit.
Figure 4:
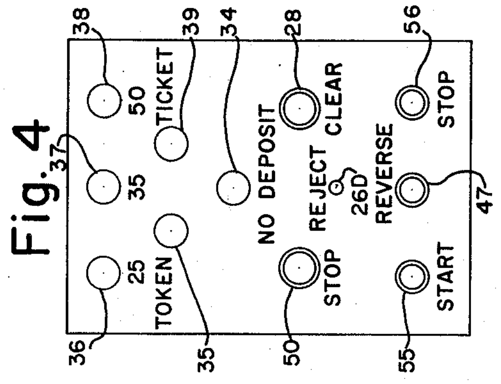
Figure 4 shows one sample panel in the observer control station.

Figure 1 is an operating view of an installed system. Moving conveyor chain 3 operates on pulleys 4 moving in the direction shown by the arrow. The driver is depositing the toll in the collection box 2 while moving with it. The case houses the registering equipment located at 5 and the drive for the conveyor located at 10. Drawer 6 is the coin box where the tolls are accumulated, and drawer 7 receives rejected coins. The pavement pedal 11 is the initiator, recording the passing of a vehicle as it is depressed, and registering "No Deposit" after a short delay if a toll has not been deposited. The toll registered is indicated at 8 for the driver's information and to forewarn him if the amount indicated is not correct as required. The distance between the collector and this lane indicator is chosen so that for the traffic (and collector) velocity in use the indication appears just before the vehicle reaches the spot. A collector, pavement pedal, and lane register is used at each lane, with the collector moving in the direction of the traffic in the lanes. Registration from each lane is indicated on its particular lane register and also simultaneously at the central indicator in the elevated control house 9, where with four or five lanes operating at the optimum velocity for efficiency and safety, a single observer can easily check registered amounts with vehicle types. For a single observer to do all checking it is necessary that the traffic in both directions be in view for a period after the toll is registered. Therefore for a four lane installation, for example, the equipment is usually installed in the arrangement shown diagrammatically in Figure 5. The collectors are shown beside their respective lanes I, II, III, IV, with the lanes indicators 8 located ahead for proper timing of lane indication. The "Stop" signals 51, a horn, and 53, a light, are controlled from the control house to signal the driver to stop when a "No Deposit" or an incorrect toll is registered. The oncoming lanes I and II have collectors located far enough away from 9 so that the vehicle is in view during and somewhat after registration. The panel viewed by the operator in 9 is shown in Figure 4, and consists of as many groups of indicators and controls as there are traffic lanes. For reasons of simplification, only one of these groups is illustrated. The automatic register 5, Figure 1, illuminates lamps 34, 35, 36, 37, 38, or 39 when a vehicle passes through a certain lane. The "Stop Signal" pushbutton 50 signals the driver as mentioned (see also Figure 3D. The "Clear" pushbutton 28 operates to pass previously rejected coins into chamber 27, Figure 7, so that the next reject is isolated for inspection if desired. The "Start-Stop" or "Start-Stop-Reverse" pushbuttns 55, 56, and 47 control the collector conveyer chain drive motors. Collectors in lanes II and III are reversible in order that heavy traffic in one direction with light traffic in the opposite direction can be accommodated by using three lanes in the heavy direction as is common practice. For this purpose registers 5, Figure 1, can be installed at both ends of collectors II and III, although prefearably more conveniently located additional collectors are installed as shown by the dashed lines of Figure 5.

Figure 2:
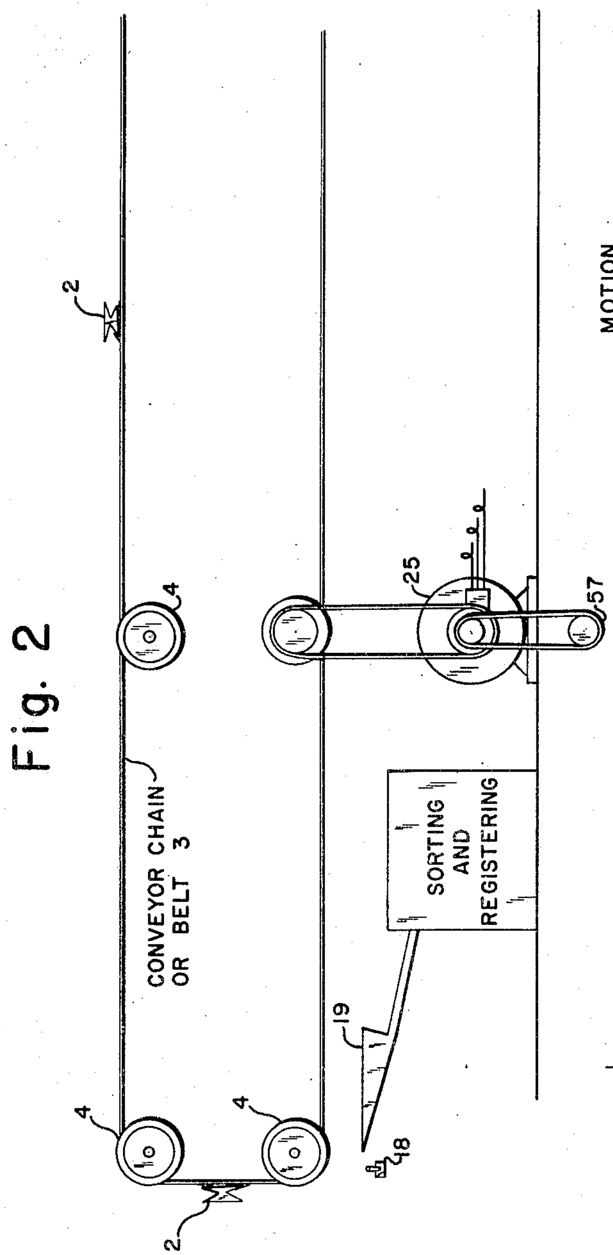
Figure 2 is an elevated side view of the conveyor system.

Figures 8, 9 and 10 show the preferred shape of the collection boxes or pans, which may be like a flattened hourglass, and the mode of operation as the pan passes through its three positions after receiving the toll (Figure 2). In Figure 8, with the direction or motion of belt 3, as shown by the arrow, and the pan 2 upright, gravity causes the coins 76 to roll or slide down into the toe (75A) of the pan. As the pan goes over pulley 4, the coins are thrown outward against surface 75B of the pan, but since this surface is substantially vertical, even after the pan is on its side and moving downward as in Figure 9, gravity holds the coins in the toe, and they remain in the pan. After the pan goes over the pulley again and is upside down, as in Figure 10, all surfaces presented to the coins are downhill, and the coins roll or slide out of the pan into receiving bin 19, whose opening has enough area to catch the coins falling in sequence. The conveyer or belt 3 is driven by motor 25, also shown in Figure 2, at a linear speed which may be varied between 25 and 40 miles per hour. Synchronization between lanes so that registrations appear in a definite pattern in the control house to prevent confusion on the part of the observer is achieved through the synchronizing shaft 57 chain connected to all drives. This means of synchronization is used in installations where collectors are located in line or not very remote from each other, and all lanes are turned on or off together, as is usually the case in two lane highways, tunnels, or bridges. For a more flexible layout, as in Figures 5, a remote synchronizer such as the General Electric Roller Drive Control, a standard commercial unit, is used.

The coins or tokens fall from the collector pan 2 into the bin 19 as the pan passes over. This receiving bin is funnel-shaped, funneling the coins into the gathering chute 58. Figure 6 shows a plan view and Figure 7 a side view of the receiving bin, the gathering chute and the connected sorting and registering apparatus. The gathering chute may have a cross section A—A, as shown in Figure 11, followed by a narrower cross section B—B, as shown in Figure 12, which force the sliding or rolling coins 76 upright, as they roll or slide down the inclined chute (Figure 7). As a result, the coins are fed upright and leaning against sidewall 80 into the sorting chute 63, the latter still sloping downward, as indicated in Figure 14 which gives a side view of this sorting chute. A plan view of the sorting chute is shown in Figure 13, while Figure 16 illustrates its cross section C—C. The cross sectional shape of this sorting chute may be used to make the coins 76 lean flatly against sidewall 64 of the chute in order to roll smoothly into the slots 65, 66, 67 and 68 leading to the different weighing levers whenever slot size and coin size correlate.

The side view of the sorting chute in Figure 14 further explains the sorting process. The coins, rolling down the incline of chute 63 and leaning against guide ridge 64 (see Figure 16) are, thus, guided downward until they arrive at a slot large enough to let them pass through. Figure 16 which represents cross section C—C of Figures 6 and 13 shows the guiding of a coin bypassing slot 66, due to its height 81. Slots 65, 66, 67, and 68 have heights graduated to receive coins or tokens selectively by diameters, 65 receiving the smallest and 68 the largest. Diameters not passed by 65 are guided to further slots by a guide ridge 64, until they arrive at an appropriate opening. As the coins pass down section 59 the magnet 12, Figure 7, stops any magnetic slugs. The coins pass from the sorting slots onto the weigh levers 70, 71, 72, and 73 (Figure 6), each of which is pivoted at 69. Figures 15, 15A and 15B give a detailed view of one weighing assembly in three different operating positions. (All assemblies are the same except for the amount of counterweighing corresponding to the particular coin assigned to that specific lever.) The lever is restrained by cam 82 (Figure 15), affecting all levers, from deflecting from the impact and coin weight, except for a small angle to close mercury switch 20. Each lever is counterweighted so that it will not deflect from the coin weight if the coin weight is less than the proper amount. After a short interval the cam driven by rotary solenoid 14 is rotated when solenoid 14 becomes energized by means of thermal delay relay 32 (Figure 3B). Relay 32, in turn, is put into operation by coin switch 13 whenever a coin passes down chute 59. The rotation of the cam allows the levers to deflect, dropping the coins in the coin box 29 and further tilting the corresponding mercury switches 20, 21, 22 and 23 providing each coin thereon is of the proper weight (Figure 15A). At the end of its stroke, solenoid 14 actuates switch 61 which opens the circuit to magnet 12, releasing any magnetic slugs, and simultaneously switch 61 energizes rotary solenoids 26 and 26A. Solenoid 26 rotates trap door 87 from the bottom of chute 59 under slug trap magnet 12, dropping arrested slugs into chute 89. Solenoid 26A operates a pulley 83 with chain 88 deflecting levers 70—73 in the opposite direction, dumping underweight coins on the levers into chute 89A (Figure 15B). Both the slugs (and any coins backed up behind them) and the underweight coins are fed onto van 90 of switch 62, which, upon closing, illuminates "reject lamp" 26D for that particular lane in the control station, Figures 3B and 4, telling the observer that coins have been rejected. After any reject occurring has been investigated, the observer pushes a "Clear" switch 28, Figure 4, opening gate 26B (Figure 3C) in the common part of chutes 89 and 89A, joined before entering reject box 27. Opening of 26B passes previous rejects into 27, so that the next reject is isolated at 26B for examination. Thus all rejects are automatically cleared from the registering device itself, so other tolls can be received and tabulated while the reject is held for examination until cleared by the observer.

Figure 4 previously mentioned shows part of the control panel in the observer control station, from which the operation of four lanes can be controlled and toll collection observed. As shown in a typical installation in Figure 1, this station is normally raised so that the observer can see traffic in all lanes, note license numbers, etc., if necessary. The definite sequence of toll indications in the control station (previously mentioned also) maintained for ease in monitoring and to avoid confusion of the observer, exists because of the synchronization of starting, stopping, and driving of the lane collectors through the mechanical coupling already described, or the control mentioned, together with proper spacing of collector pans 2, as shown in Figure 5. From the physical spacing of the pans, Figure 5, it is seen that the successive pans pass into the registers in the sequence IV, III, II, I, IV, III, II, I, IV, etc.

Figure 3:
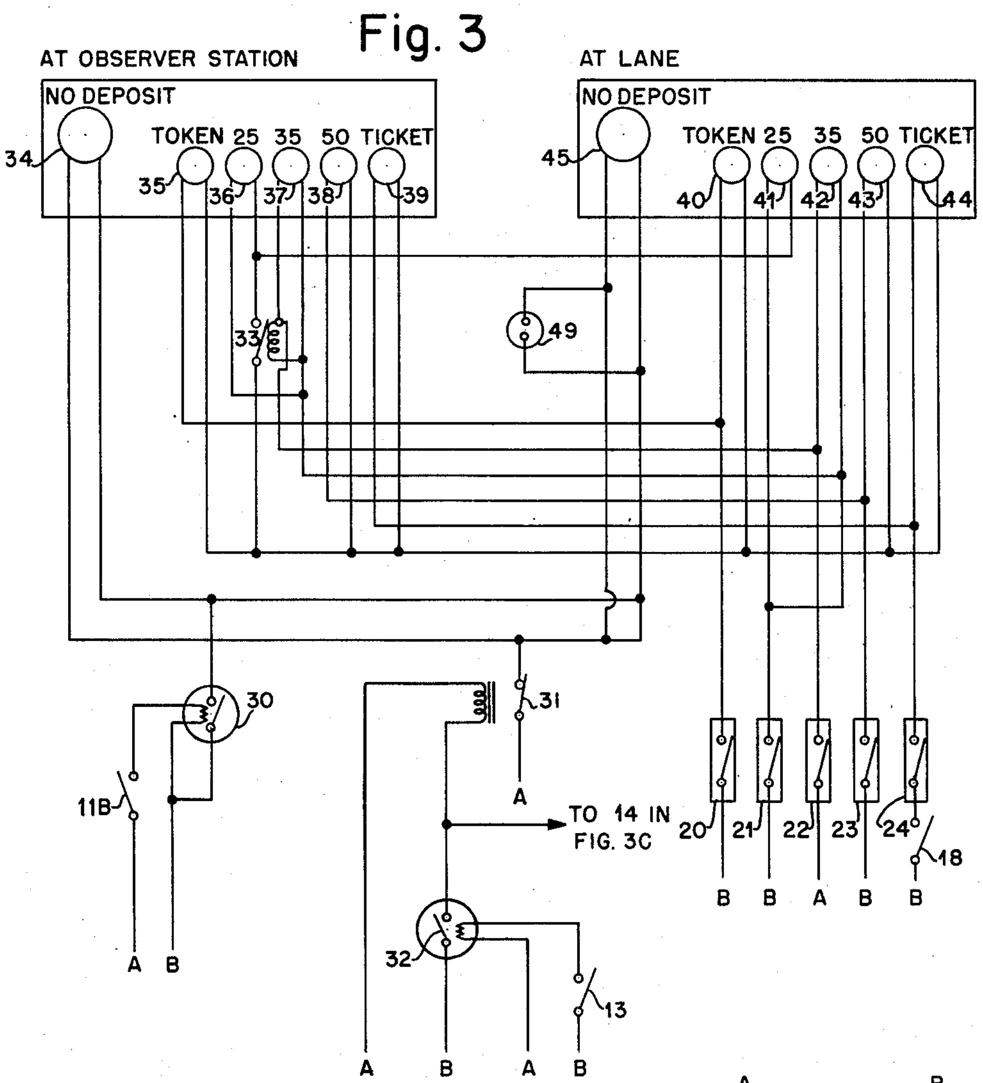
Figure 3 is a diagram of the circuits leading to the panel indicators both in the observer control station and at the traffic lanes.
Figures 3B, 3C:
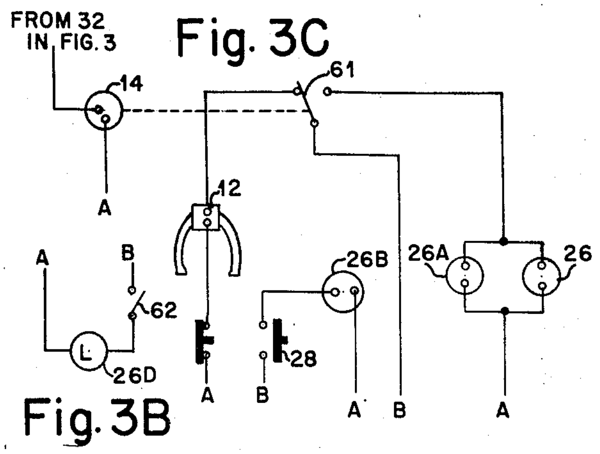
Figure 3B illustrates the circuits which operate the magnet and the solenoids.
Figure 3C shows the reject circuit.

The circuits of Figure 3 lead from the sorting and registering devices at the traffic lanes to the panel indicators both at the observer control station and at the specific traffic lane involved. The letters A and B in the diagram of Figure 3 as well as in the diagrams of Figures 3A, 3B, 3C and 3D are used to indicate the two polarities of a commonly available power supply. The pavement pedal 11, Figures 1 and 1A, depressed momentarily by the passing vehicle, is a conventional butterfly dashpot whose plunger disc deflects quickly in one direction, but returns slowly (due to disc flappers closing) under pressure of spring 11A. Switch 11B is closed by the first part of the travel and is subjected to considerable overtravel, so that it remains closed for an interval while the plunger returns. During this interval the thermal delay relay 30 is energized and after a time closes its contacts. This will indicate "No Deposit" on indicator lights 34 and 45 unless a toll being received by the register momentarily closes switch 13, Figures 7 and 3, as the coins pass down section 59. Closing of switch 13 causes delay relay 32 to close at a time just before relay 30 closes, and the closing of 32 in turn activates relay 31, opening its contacts so that if a toll is received lighting of indicators 34 and 45 is prevented. The delay in the closing of 32 allows the coins to settle on the tabulating levers 70, 71, 72 and 73. As the coins arrive on their respective levers, the levers deflect 2 to 4 degrees, closing the corresponding switches 20, 21, 22 and 23 (which are the sensitive type closing on about 1 degree rotation). From Figure 3 it is seen that indicators 35, 36, 37, 38, or 39 and 40, 41, 42, 43, or 44 at the lane indicator will be illuminated. The particular system illustrated for description is adapted to collect and tabulate tolls consisting of tokens, 25 cents (a quarter), 35 cents (a quarter and a dime), 50 cents (a fifty cent piece), or a ticket. Indicators 36 and 37 are interconnected so that if a dime is received, and a quarter is also received, relay 33 opens indicator 36, and only 37 is illuminated to register the 35 cent toll. By similar interconnections well known to the automatic vending machine art, 25 cent tolls of two dimes and a nickel, and 50 cent tolls consisting of two quarters may be made, but this is not relevant to the disclosure. At each entrance to the bridge a posted sign states the tolls required, and also states the coin combinations required for payment. A change booth may be established at each entrance to the byway prior to entrance to the collection part of the lanes, so that persons not having the correct change may obtain it before entering the lanes where traffic moves in an uninterrupted stream. Preferably, however, a change-making machine is used at this location with the machine at car window height so that vehicle operators may obtain change at curbside by depositing, say, a quarter or a fifty cent piece and receiving from the machine two dimes and a nickel or two quarters.

(The additional mercury switch 24, Figure 3, or alternatively switch 18, Figures 2 and 3 are provided so that either may be used, but not both. If 24 is left permanently closed, switch 18 at the entrance to the receiving bin 19, Figure 2, may be actuated by a ticket of the proper size inserted in a clip on the receiving pan 2 by the vehicle operator, and will so register. Or if 18 is left permanently closed, mercury switch 24 and its lever may be used to register an additional type token or toll. However, where automatic collection is used, the use of tickets is almost never considered desirable.)

The receipt of a toll in actuating 13, which is a ballistic type thermal delay tube relay, and therefore after a delay, relay 32, Figure 3, also operates rotary solenoid 14, Figures 3C and 15. This occurs after the toll indications have appeared, and deflects the levers to drop the coins into toll box 29 (Figure 7). Rotary solenoid 14 is a spring return type. On the armature a floating flywheel restrained by a clock-type spring overtravels after the quick spring return, see Figure 7, momentarily closing switch 61, Figure 3C, which actuates rotary solenoids 26 and 26A (Figures 3C, 7 and 15) and opens magnet 12, dropping rejects as previously discussed into the chute leading to box 27 (Figure 7). Rejects are stopped for inspection at the gate 26B (Figures 3C and 7). Deflection of this gate closes switch 62 and indicates by pilot light 26D, Figures 3B and 4, that a reject rather than an improper toll has been received. After inspection, the observer may use push button 28, Figures 3C and 4 to clear the reject. He may also use push button 50 to sound warning horn 51 and lane flasher 53, Figures 3D and 5 to stop the offending vehicle. Standard vending machine collectors may also be used.

Figure 3A:
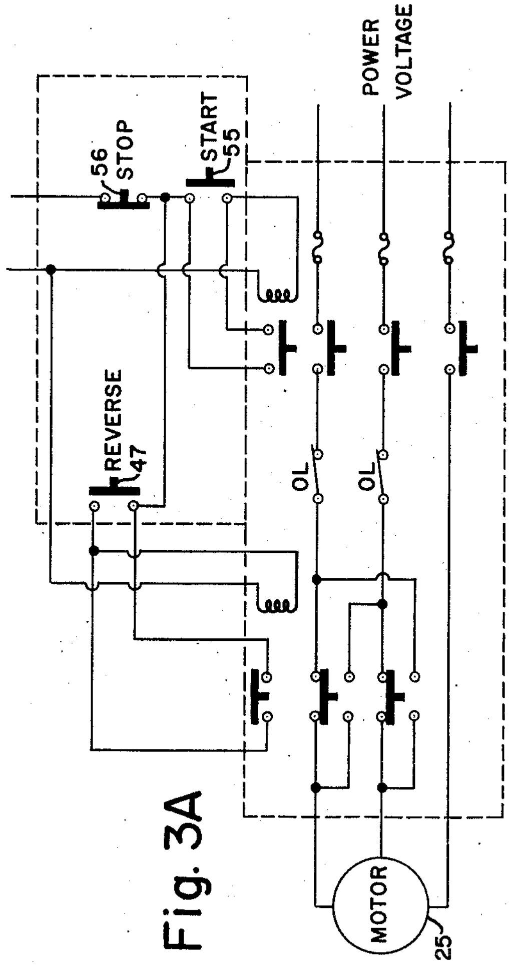
Figure 3A shows the motor circuits.

The motor control circuits for the collector chain drive motor 25, using the "Start," "Stop," and "Reverse" push buttons, Figures 3A and 4 are entirely conventional.

Having described my invention, what I desire to protect and claim by Letters Patent is:

1. In a collection and signaling system, in combination, a moving series of collector boxes adapted to operate adjacent a traffic lane and to receive deposits from moving vehicles, means for inverting said moving collector boxes to empty the contents thereof into stationary receiving chutes, said moving collector boxes being of such shape as to permit said emptying only when said boxes are in a substantially vertically inverted position, means for sorting and registering said deposits fed by said receiving chutes, a first register indicator, a second register indicator, means for actuating said first and second indicator by said sorting and registering means, said first indicator being located adjacent said traffic lane and far enough removed from said registering means that said moving vehicles do not arrive at said indicator before said indicator is actuated, said second indicator being located at a visual monitoring station and far enough removed from said registering means that said moving vehicles do not arrive in the immediate front of said monitoring station before said second indicator is actuated.

2. The combination according to claim 1 comprising additional signaling means responsive to lack of deposits and improper deposits, and signaling means manually operable from said monitoring station.

3. The combination according to claim 2 in which said sorting and registering means comprise a member inhibiting the actuation of said additional signaling means responsive to said lack of deposits.

4. The combination according to claim 1 including a plurality of traffic lanes with one common monitoring station, and means for synchronizing in sequence the motion of said moving series of collector boxes in regard to said plurality of traffic lanes.

5. The combination according to claim 4 in which the motion of said moving collector boxes in a plurality of traffic lanes is provided by common driving means, and in which the position of said collector boxes in each traffic lane is staggered relative to the position of said collector boxes in the other traffic lanes so as to eliminate a simultaneous actuation of said indicators in reference to different traffic lanes.

6. The combination according to claim 4 in which the direction of motion for, at least, one moving series of collector boxes may be reversed.

7. In a collecting and signaling system, in combination, a moving collector box adapted to operate adjacent a traffic lane and to receive deposits from moving vehicles, means for inverting said moving collector box to empty the contents thereof into a stationary receiving chute, said moving collector box being of such shape as to permit said emptying only when said box is in a substantially vertically inverted position, means for sorting and registering said deposits fed by said receiving chute, a register indicator, and means for actuating said indicator by said sorting and registering means.

8. The combination according to claim 7 which comprises a moving series of collector boxes and means for emptying said moving collector boxes into stationary receiving chutes.

9. The combination according to claim 7 in which said moving collector box is of a flattened hourglass-like shape.

10. The combination according to claim 7 which comprises a first and a second register indicator, and means for actuating said first and second indicators by said sorting and registering means.

11. The combination according to claim 10 in which said first indicator is located adjacent said traffic lane, and said second indicator is located at a visual monitoring station.

12. The combination according to claim 11 in which said first and second indicators are far enough removed from said registering means that said moving vehicles do not arrive at said first indicator or in front of said monitoring station, respectively, before said first and said second indicators are actuated, respectively.

13. The combination according to claim 7 comprising additional signaling means responsive to lack of deposits and improper deposits.

14. The combination according to claim 13 in which said sorting and registering means comprise a member inhibiting the actuation of said additional signaling means responsive to said lack of deposits.

15. The combination according to claim 7 comprising signaling means manually operable from said monitoring station.

16. The combination according to claim 7 including a plurality of traffic lanes with one common monitoring station, and means for synchronizing in sequence the motion of said moving collector boxes in regard to said plurality of traffic lanes.

17. The combination according to claim 16, in which the motion of said moving collector boxes in a plurality of traffic lanes is provided by common driving means, and in which the position of said collector boxes in each traffic lane is staggered relative to the position of said collector boxes in the other traffic lanes so as to eliminate a simultaneous actuation of said indicators in reference to different traffic lanes.

18. The combination according to claim 16 in which the direction of motion of said moving collector boxes may be reversed at, at least, one traffic lane.

JOHN R. STOVALL, Jr.

References Cited in the file of this patent

UNITED STATES PATENTS

| Number | Name | Date |
|---|---|---|
| 469,882 | Emery | Mar. 1, 1892 |
| 1,598,804 | Brumback | Sept. 7, 1926 |
| 1,667,121 | Kelleman | Apr. 24, 1928 |
| 1,792,835 | Grondahl | Feb. 17, 1931 |
| 1,992,269 | White | Feb. 26, 1935 |
| 2,015,607 | Shinn | Sept. 24, 1935 |
| 2,037,190 | Backer | Apr. 14, 1936 |
| 2,065,048 | Burnside | Dec. 27, 1936 |
| 2,073,834 | Duany | Mar. 16, 1937 |
| 2,094,216 | Hunter | Sept. 28, 1937 |
| 2,423,502 | Jorgensen | July 8, 1947 |
| 2,487,463 | Miller | Nov. 8, 1949 |